May 25, 1971   W. P. SIEGMUND   3,580,775
METHOD OF MAKING FIBERSCOPES WITH TRIMMED TIPS
Filed April 28, 1969
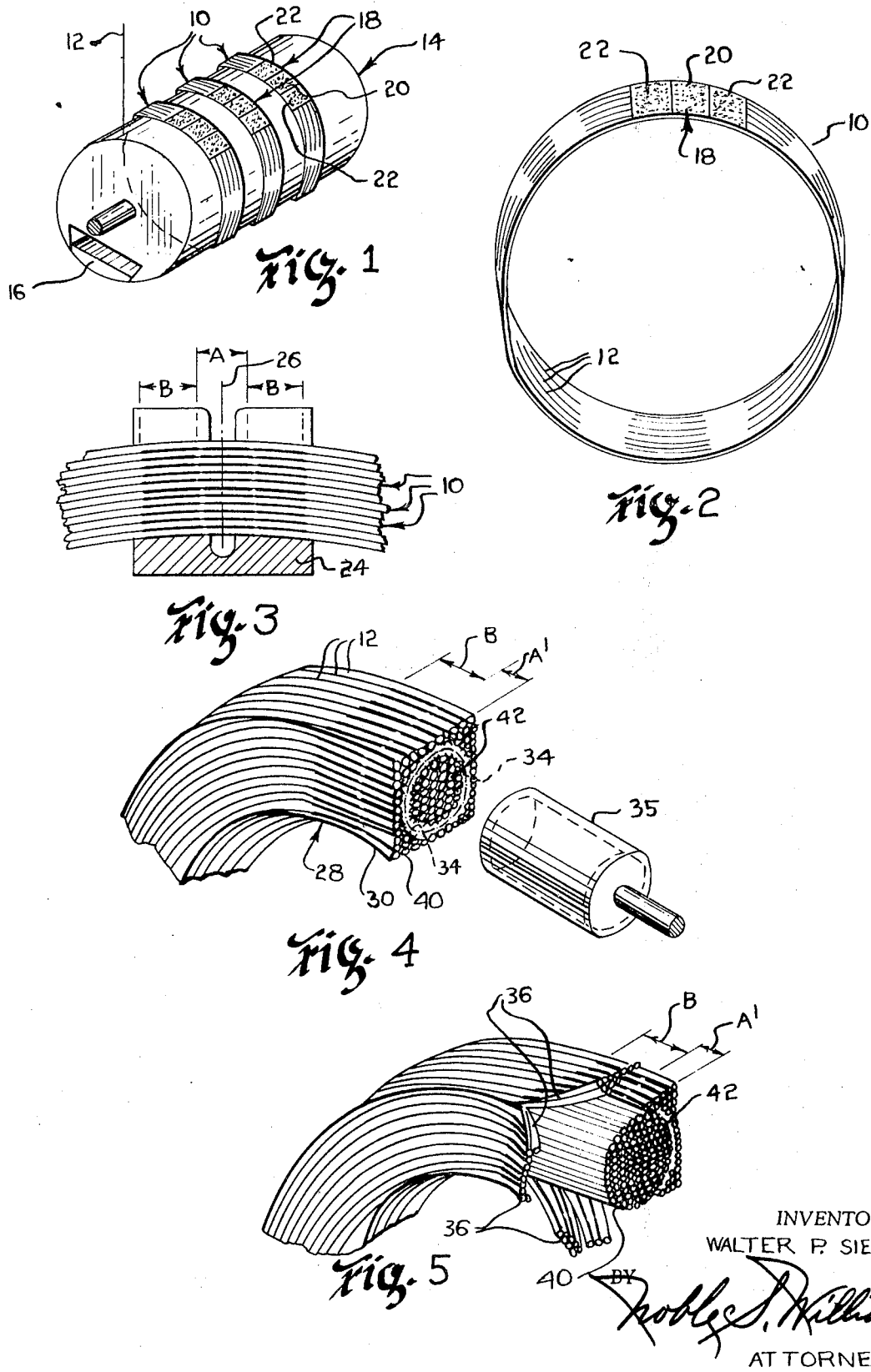
INVENTOR.
WALTER P. SIEGMUND
BY Robley S. Williams
ATTORNEY

United States Patent Office 3,580,775
Patented May 25, 1971

3,580,775
METHOD OF MAKING FIBERSCOPES WITH TRIMMED TIPS
Walter P. Siegmund, Woodstock, Conn., assignor to American Optical Corporation, Southbridge, Mass.
Filed Apr. 28, 1969, Ser. No. 819,791
Int. Cl. B32b 17/02; G02b 5/16
U.S. Cl. 156—247          5 Claims

ABSTRACT OF THE DISCLOSURE

Fiberscopes formed of a multiplicity of accurately superimposed circular fiber ribbons. A portion of the length of each ribbon is coated in one zone with a material of high glass-bonding strength and with a strip of an adhesive parting agent at each side of the high strength bonding material. The coated portions are accurately superimposed and cured at an elevated temperature to produce a high strength bond centrally of the coated portions through which a cut is made to form opposite ends of the fiberscope. These ends are cut, ground, sawed or core drilled partially into adjoining areas of the adhesive parting agent to provide the fiberscope with tips of a desired shape and size whereupon trimming of the remaining length of the fiberscope to a corresponding shape and size is effected by delamination.

BACKGROUND OF THE INVENTION

Field of the invention

Fiber optics with particular reference to improvements in method of constructing fiberscopes.

Description of the prior art

Long and flexible image transmitting fiber optic bundles, commonly known as fiberscopes, require secure bonding of corresponding opposite ends of their fibers and it is generally also required that these ends of the bundle be formed to particular cross-sectional sizes and shapes for adapting them to eyepieces, objective lens systems and/or other forms of apparatus to be used in conjunction with fiberscopes. Accordingly, fiberscopes are usually formed to a larger cross-sectional size than is ultimately desired of them and then trimmed to a finished shape and size.

Heretofore, fiberscopes having their corresponding opposite ends bonded with vinyl lacquers and the like have been trimmed to desired shapes and sizes by delamination. While this type of bonding lends itself well to the delamination procedure it has, however, the side effect of preventing strong bonding between the fibers even when other bonding agents of high strength are applied over the vinyl lacquer. Thus, tips of the finished bundle are vulnerable to high temperature and humidity due to the presence of the vinyl lacquer with the result that distortion of end faces and/or exudation of some residual resin may occur when the fiberscope is exposed to elevated temperatures.

On the other hand, in cases where high strength bonding is attempted with epoxy resins, for example, so as to avoid the vulnerability to high temperature and humidity, considerable difficulty is experienced in trimming the fiber bundles to desired shapes and sizes since trimming by delamination is prevented. The alternative of trimming by sawing, grinding or trepanning the high strength bond area is attended by a high incidence of breakage and other damage to fibers particularly at transitional zones between bonded and unbonded portions thereof. This damage which is usually caused by fouling of the transitional zone with grinding particles, chips and/or other residue of cutting operations and/or direct engagement by the trimming tool with potentially useful fibers results in inferior, if not unacceptable end products.

The present invention relates to improvements in method of forming fiberscope tips wherewith the aforesaid and related problems and drawbacks of conventional processing are avoided.

SUMMARY OF THE INVENTION

High strength bonded and cleanly, accurately trimmed fiberscopes are produced according to principles of this invention by forming a three zone bonding area in the basic structure of accurately superimposed circular ribbons of fiber from which the trimmed fiberscope is formed.

The ribbons, each being in the form of a closely packed helix of one fiber thickness, are individually coated throughout a bonding section of predetermined length. A high strength bonding material such as a 2-stage epoxy resin is extended across a central zone of the bonding section and the remainder of the bonding section at opposite sides of the central zone is coated with a weaker glass bonding material such as, for example, a vinyl lacquer.

The ribbons are stacked with their respective bonding sections accurately superimposed and are cured by heating to produce the high strength bond throughout the central zone of the aggregate of bonding sections.

A transverse cut through the bonded assembly of fiber ribbons intermediately of the high strength sections produces identically geometrically patterned opposite ends of the basic fiberscope structure.

These ends of the structure, which will not delaminate at their tips, are trimmed by first cutting, grinding or trepanning through the high strength bond a short distance, for example one quarter of the way, into the adjacent weaker bond whereupon clean and accurate trimming of the fiberscope throughout the remainder of its length is accomplished by delamination. The low strength bonding material acting as a parting agent between individual fibers of the structure permits such delamination without adverse effect upon respectively adjoining fibers within the areas of bonding or the transitional area between bonded and unbonded portions thereof. It should be noted that this combined cutting and delaminating technique, in addition to rendering it possible to produce high strength and high temperature resistant fiberscope tips, avoids the necessity for engaging or entering into the transitional area of the fiberscope between bonded and unbonded fibers with cutting, grinding or other forms of tools which, in addition to avoiding breakage of fibers in that area by contact with the tool or tools, prevents fouling of the area with grinding residue and the like.

Details of the present invention will become more fully understood by reference to the following description and the accompanying drawing.

DESCRIPTION OF THE DRAWING

FIG. 1 diagrammatically illustrates, in perspective, a technique for forming individual ribbons of fiber intended to be assembled in accurately superimposed bonded relationship with each other as the basic structure of a fiberscope;

FIG. 2 is an illustration, in perspective, of one such ribbon;

FIG. 3 is a fragmentary side elevational view of a basic fiberscope structure wherein means for facilitating assembly of the structure is illustrated;

FIG. 4 is an illustration, in perspective, of one end of the basic fibrescope structure with means being diagrammatically illustrated for effecting an initial step in trimming the structure according to principles of the invention; and FIG. 5 is a view also in perspective of the same fiberscope structure illustrating a final step in the trimming operation.

DESCRIPTION OF THE PREFERRED EMBODIMENTS

FIGS. 1, 2 and 3 illustrate a technique for forming the basic structure of a fiberscope according to principles of this invention. This technique involves the making of a multiplicity of individual fiber ribbons 10 which are subsequently stacked one over the other, bonded together and cut transversely through the bond to form opposite end faces of the fiberscope.

Referring more particularly to FIG. 1, it can be seen that ribbons 10 each comprise a closely packed helix formed of a single fiber 12. Fiber 12 is preferably of the well-known type having a core of high refractive index light-conducting material clad with a material of lower refractive index than the core whereby fiber 12 or any section of its length will conduct light by the principles of total internal reflection from one end to the other thereof. High and low refractive index materials commonly used in the structure of such fibers are flint and crown glasses respectively.

Ribbons 10 are formed by winding fiber 12 along drum 14 with a winding lead of approximately one fiber diameter whereby the closely packed helix is developed. A succession of ribbons 10 may be formed along the length of drum 10 with continuous winding; the separation between the ribbons being produced by large leads in the winding between each ribbon 10. Ribbons 10, of course, may be formed of individual lengths of fiber 12 if desired.

Ribbons 10 are removed from drum 14 simply by retracting segment 16 of the drum and sliding each ribbon over an end of the drum. Prior to their removal from drum 14, however, the ribbons are each coated throughout a section 18 of their respective lengths with a bonding material which keeps the formation of fibers in sections 18 intact.

According to this invention, sections 18 are each made up of three zones. The centermost zone 20 is coated with a high glass-bonding strength material preferably consisting of one of the well-known types of two-stage epoxy resins which are thermosetting adhesives capable of forming a secure bond by drying at room temperature and are hardenable to high strength by curing at a temperature of, for example, 350° F., for approximately five minutes.

Zones 22 of section 18 (see FIG. 2) at each side of zone 20 are coated with a low strenght bonding material or parting agent such as, for example, a vinyl lacquer.

Ribbons 10 so coated along sections 18 and removed from winding drum 14 are stacked one over the other in an aligning and curing fixture 24 (FIG. 3) corresponding sections 18 thereof accurately superimposed. A thin coating of bonding material of the type used in zone 20 may be placed between successive ribbons 10 to tack them together. This avoids misalignment problems which might otherwise occur during stacking.

On completion of the stacking operation, the aggregate of sections 18 is heated to a temperature and for a period of time sufficient to effect curing of the bonding material in zones 20. Thus, section A (FIG. 3) of the assembly of ribbons 10 is afforded a high strength bond which, in subsequent use of the assembly, is not appreciably affected by high temperature or humidity. Adjoining sections B however, are not appreciably affected as to their strength of bond and remain readily adaptable to forced delamination.

Following the aforesaid curing of section A and cooling of the assembly of ribbons 10, the unit is cut transversely substantially centrally through section A (e.g. along line 26) so as to form opposite ends of a basic fiberscope structure 28, a portion of which having end 30 is shown in FIG. 4. End 30, having fibers 12 of ribbons 10 all securely bonded together in section A' of high strength (i.e. ½ of section A in FIG. 3) is backed up by zone B which is readily adaptable to force delamination.

Structure 28 is next trimmed to a desired shape and size (e.g. circular as illustrated by dot-dash outline 34 in FIG. 4) by trepanning through section A' partially into section B with, for example, a core drill 35. Following this, portions 36 of the fiber structure 28 around tip 40 (FIG. 5) are pried outwaardly away from tip 40 and peeled from structure 28 by delamination of the fibers in section B. The resulting fiberscope and more particularly tip 40 thereof is thus rendered readily adaptable to the reception of end fittings such as optical objectives, couplings and/or sheathings commonly applied to fiberscopes or fiber optic light pipes of the type dealt with herein. The hard bonding of fibers adjacent face 42 of the resulting fiberscope or light pipe lends itself readily to conventional grinding and polishing operations used to enhance the light-transmitting efficiency of such devices.

It is to be understood that trimming of the basic fiberscope structure 28 may be initiated by grinding or sawing through section A' partially into section B and continued by delamination of the remaining portion of section B. In any case it is only necessary to partially enter section B with a cutting, grinding or trepanning tool so that all danger of engaging portions of fibers 12 in the transitional area adjacent the bond or fouling of the transitional area with grinding, cutting or drilling residue may be completely avoided.

I claim:

1. The method of making fiberscopes of a multiplicity of circular ribbons of light-conducting glass fibers comprising:

coating each fiber ribbon in a first zone extending thereacross with an adhesive bonding material adapted to be rendered high in strength by curing at high temperature;

coating each of said ribbons in second zone one at each side of said first zone with a relatively weak glass bonding material which is substantially unaffected as to its bonding strength by exposure to high temperature whereby said weak bonding material will subsequently function as a parting agent between lengths of fibers joined thereby;

stacking said ribbons one over the other with said first and second zones of bonding material respectively superimposed;

applying heat to the aggregate of said superimposed zones of a temperature and for a period of time both sufficient to cure said bonding material in said first zones;

cutting substantially centrally through said first zones across the lengths of fiber therein to form opposite ends of said fiberscope;

shaping said ends to a desired smaller cross-sectional size and shape throughout the extension of said first mentioned bonding material and partially into adjoining second zones of said relatively weak bonding material; and trimming the remainder of the length of said fiberscope to a corresponding cross-sectional size and shape by delaminating excess fibers in said second zones and lifting same away from said fiberscope.

2. The method of making fiberscopes according to claim 1 wherein said first zones of said fiber ribbons are coated with an epoxy resin and said second zones are coated with a vinyl lacquer.

3. The method of making fiberscopes according to claim 1 wherein said shaping of said opposite ends of said fiberscope is effected by trepanning longitudinally thereto.

4. The method of making fiberscopes according to claim 1 wherein said shaping of said opposite ends of said fiberscope is effected by grinding the sides thereof.

5. The method of making fiberscopes according to claim 1 wherein said shaping of said opposite ends of said fiberscope is effected by sawing thereinto.

References Cited
UNITED STATES PATENTS

| | | | |
|---|---|---|---|
| 3,355,273 | 11/1967 | Siegmund et al. | 156—296X |
| 3,383,192 | 4/1968 | Siegmund | 350—96B |
| 3,472,718 | 10/1969 | Siegmund | 156—296X |
| 3,514,351 | 5/1970 | Mukai | 350—96(B) |

BENJAMIN R. PADGETT, Primary Examiner

R. S. GAITHER, Assistant Examiner

U.S. CL. X.R.

156—181, 211, 296; 350—96